UNITED STATES PATENT OFFICE.

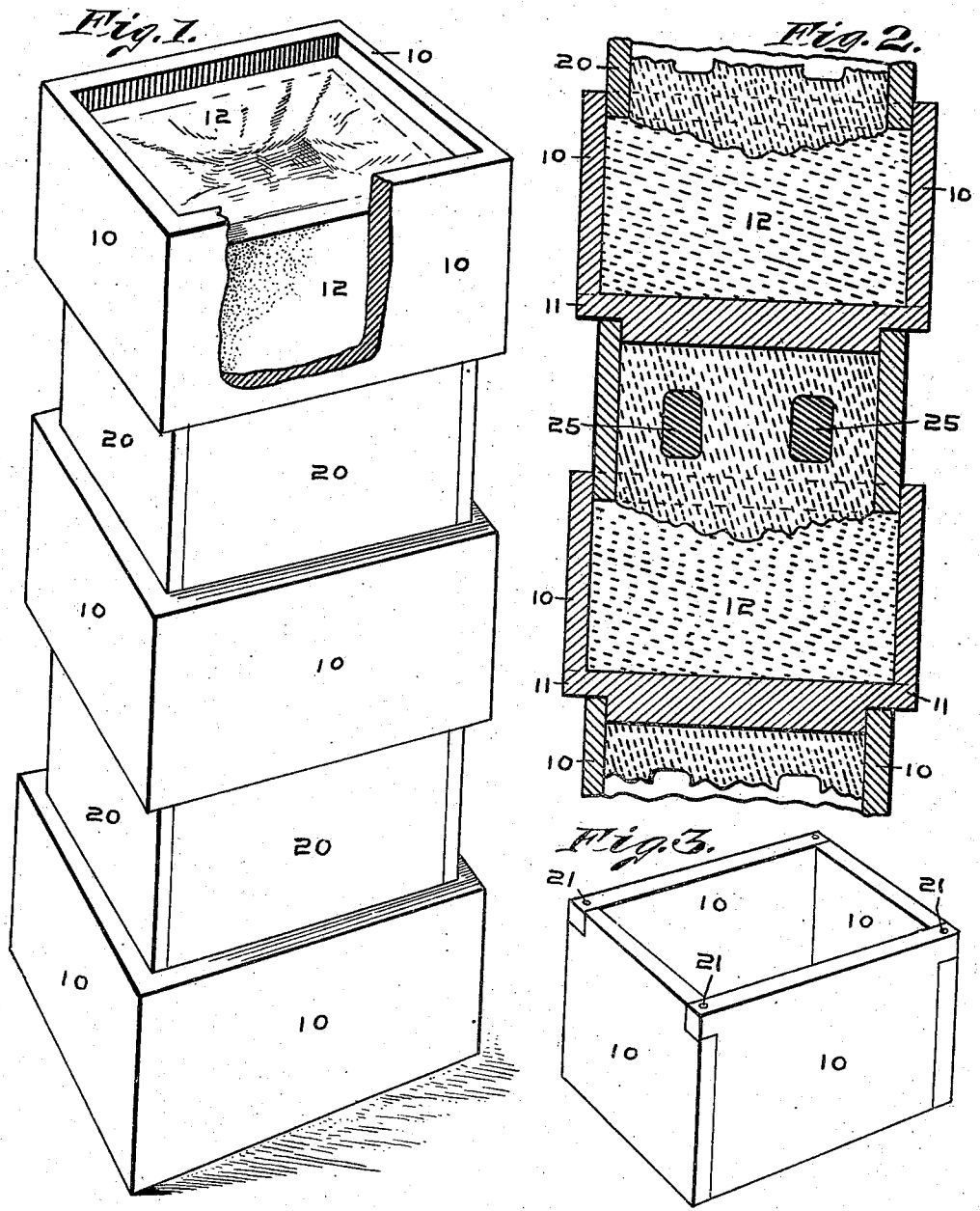

HENRY A. ZURBUCH, OF MARION, INDIANA.

MOLD FOR MAKING PLASTIC BLOCKS.

No. 855,084.  Specification of Letters Patent.  Patented May 28, 1907.

Application filed September 25, 1906. Serial No. 336,097.

*To all whom it may concern:*

Be it known that I, HENRY A. ZURBUCH, a citizen of the United States, residing at Marion, in the county of Grant and State of Indiana, have invented certain new and useful Improvements in Molds for Making Plastic Blocks, of which the following is a specification.

This invention relates to a mold in which plastic blocks can be formed by pouring the cement therein, and the object of the invention is to provide a mold which will be simple in construction, cheap to manufacture and one in which the blocks of the character herein above mentioned can be expeditiously and economically produced.

I accomplish the objects of my invention by the mechanism illustrated in the accompanying drawings, in which Figure 1 is a perspective view of a series of molds stacked above one another as the process of making the blocks is carried forward. By so stacking the blocks the economy in space becomes apparent. Fig. 2 is a central vertical sectional view of a plurality of molds placed one above another and shows how the molds can be nested. Fig. 3 is a perspective view of the box wherein the body of the blocks is formed.

The advantages in making cement blocks with my invention over the machine pressed blocks are, first, that I can cheaply make a large number of different matrices to produce a large number of blocks with faces of various irregular outlines, so that the similarity of the effect of a house which is so common with the machine made blocks, is removed; and second, a machine made block is more porous and will thus absorb water which will keep the walls damp, whereas a poured block having a finer grain is impervious to water on account of the perfect homogeneousness of the block secured when the congealing of the cement is permitted to take place undisturbed. The expense of a machine is eliminated with my invention, and the expense of making metal relief molds for a machine is also eliminated. The expense of making these molds accounts for the few used in making blocks and thus a less variety of various shaped blocks are employed in building houses. A house built of these stones is easily discernible at a distance on account of the effect produced, which is nothing like a house built of real stone. To remedy this defect I provide a device by which a large variety of various surface blocks can cheaply be produced.

To enable me to produce a large variety of blocks, I provide a series of boxes which are formed of the side walls 10 and the bottoms 11. The number of boxes employed will depend upon the number of variously shaped blocks I may select to be used in building the house. Having decided on the number of boxes to be used, I select a corresponding number of building stones having the variously formed surfaces, and which are kept on hand to make the impressions from which the concrete blocks will be fashioned. I fill the boxes 10 with a heterogeneous material 12, having great absorbent qualities in which the component parts may consist temporarily of sand, cement, charcoal or sawdust, or like material. I take the irregularly faced block and press or bury its face into the material 12 to form a matrix after which the cement block will be fashioned. The material 12 has sufficient cohesive qualities to retain a perfect outline of the imprint made when the patterned stone is withdrawn therefrom. After a matrix has been formed I provide a box 20 which will fit the inside walls of the box 10 which holds the matrix. This box is made so it can be separated, and when in operating position is held together at the corners by means of the pins 21. When the box 20 has been placed into position, the liquid cement is then poured therein until it is about one third full, at which time the core-pins 25 are placed therein, when the remaining part of the box is then filled. The pins 25 form the hollow portions of the blocks which are common to all blocks of this character.

A large volume of water is necessary to reduce the cement to a state so that it can be poured, and as it would take a week or ten days for the water to evaporate from a cube of such proportion as to permit it to sufficiently congeal or solidify to enable the removal of the matrix, much time would be lost. I overcome this objection by accelerating the removal of the water by forming the matrix of a material and of such proportion that it will readily absorb all the water from the newly made block. This enables me to remove the matrix from the block in the morning which was made the evening before—about twelve hours being sufficient. I add a sufficient quantity of salt or other suitable mineral to the material 12 which forms the matrices so that the adhesive quality of the cement is destroyed, and thus easily effect the separation of the blocks from the matrices. After the matrices have been removed from the green blocks, the boxes 20 are usually left on the blocks for a day or two so that the weight of the green masses will not throw the blocks out of plumb.

Thus it will be seen that with the use of my invention a large variety of stone faced blocks can be accurately made to imitate real stone, in a cheap and efficient manner.

Having thus fully described my said invention, what I desire to secure by Letters Patent, is—

1. A mold for making plastic blocks comprising a matrix composed of cohesive, heterogeneous, hygroscopic material, for accelerating the removal of the water from the molded block.

2. A mold for making plastic blocks comprising a matrix composed of cohesive, heterogeneous, hygroscopic material, to accelerate the removal of the water from the molded block, and a frame to support said matrix.

3. A mold for making plastic blocks comprising a matrix composed of cohesive, heterogeneous, hygroscopic material, to accelerate the removal of the water from the molded block, a frame to support said matrix, and a block-frame to fit the matrix-frame and adapted to shape the body of the block.

In witness whereof, I, have hereunto set my hand and seal at Indianapolis, Indiana, this, 18th day of September, A. D. one thousand nine hundred and six.

HENRY A. ZURBUCH. [L. S.]

Witnesses:
 F. W. WOERNER,
 L. M. HELMUTH.